United States Patent
Schlesiger et al.

(10) Patent No.: US 9,058,035 B2
(45) Date of Patent: Jun. 16, 2015

(54) PRECISE ASCERTAINMENT OF ACTUATING POSITION FOR A MOTOR-DRIVEN VEHICLE PART

(71) Applicant: Brose Fahrzeugteile GmbH & Co. KG Hallstadt, Hallstadt (DE)

(72) Inventors: Markus Schlesiger, Hallstadt (DE); Marcus Scholz, Lichtenfels (DE); Daniel Welz, Schweinfurt (DE); Thomas Lehnert, Bamberg (DE); Markus Wunder, Viereth-Trunstadt (DE)

(73) Assignee: Brose Fahrzeugteile GmbH & Co. KG, Hallstadt, Hallstadt (DE)

( * ) Notice: Subject to any disclaimer, the term of this patent is extended or adjusted under 35 U.S.C. 154(b) by 187 days.

(21) Appl. No.: 13/861,922

(22) Filed: Apr. 12, 2013

(65) Prior Publication Data
US 2013/0271058 A1    Oct. 17, 2013

(30) Foreign Application Priority Data

Apr. 12, 2012 (DE) .......................... 10 2012 007 331
Sep. 7, 2012 (DE) .......................... 10 2012 017 741

(51) Int. Cl.
*H02P 1/04* (2006.01)
*G05B 24/02* (2006.01)

(52) U.S. Cl.
CPC ....................................... *G05B 24/02* (2013.01)

(58) Field of Classification Search
USPC ......... 318/461, 443, 445, 456, 466, 468, 286, 318/282, 283
See application file for complete search history.

(56) References Cited

U.S. PATENT DOCUMENTS

| | | | | |
|---|---|---|---|---|
| 4,468,596 A | * | 8/1984 | Kinzl et al. | 318/287 |
| 6,064,165 A | * | 5/2000 | Boisvert et al. | 318/465 |
| 6,166,508 A | | 12/2000 | Kalb | |
| 6,710,561 B2 | * | 3/2004 | Dobson | 318/286 |
| 6,753,669 B2 | * | 6/2004 | Spreng et al. | 318/469 |
| 6,773,053 B2 | * | 8/2004 | Richter et al. | 296/146.16 |
| 7,402,971 B2 | * | 7/2008 | Averitt | 318/466 |

FOREIGN PATENT DOCUMENTS

DE    196 32 139 C1    7/1997
WO    WO 2009/121518 A1    10/2009

* cited by examiner

*Primary Examiner* — Rina Duda
(74) *Attorney, Agent, or Firm* — Muncy, Geissler, Olds & Lowe, P.C.

(57) ABSTRACT

A method is specified for ascertaining an actuating position of a vehicle part that can be moved by an electric actuating motor. The speed of an actuating motor correlated therewith is acquired in a time-resolved manner during an actuation process. An initial no-load phase of the actuation process is identified, during which the actuating motor rotates while overcoming the system tolerance of the actuating mechanism without motion of the vehicle part. An actuating position measure for the actuating position of the vehicle part is ascertained from the motor rotation, with this measure being corrected during the no-load phase. By averaging over time, a test quantity is ascertained from the second derivative or the measured quantity correlating herewith. The end of the initial no-load phase is identified in this process when the test quantity exceeds a predetermined limit.

11 Claims, 3 Drawing Sheets

PRECISE ASCERTAINMENT OF ACTUATING POSITION FOR A MOTOR-DRIVEN VEHICLE PART

This nonprovisional application claims priority under 35 U.S.C. §119(a) to German Patent Application No. DE 10 2012 007 331.3, which was filed in Germany on Apr. 12, 2012 and to German Patent Application No. DE 10 2012 017 741.0, which was filed in Germany on Sep. 7, 2012, and both of which are herein incorporated by reference.

BACKGROUND OF THE INVENTION

1. Field of the Invention

The invention relates to a method for ascertaining the actuating position of a vehicle part that can be moved by means of an electric actuating motor via an actuating mechanism. The invention also relates to an associated actuating device for automatically moving the vehicle part. The vehicle part to be moved is, in particular, a vehicle window. The actuating device is, in particular, an electric motor driven window regulator, preferably a cable window regulator.

2. Description of the Background Art

A conventional cable window regulator usually has an electric actuating motor whose motor shaft is coupled to the vehicle window to be moved. The actuating motor is typically driven by a control unit, e.g. composed of a microcontroller. The current actuating position of the window generally is calculated continuously by the control unit during each actuating operation, in particular in order to be able to move to specific window positions in a targeted way.

The actuating position of the window usually is derived by the control unit from the angle of rotation through which the actuating motor rotates during the actuation process. This angle of rotation and the speed of the motor shaft that can be derived therefrom are often measured directly. A Hall sensor that works together with a ring magnet attached to the motor shaft in a rotationally fixed manner is typically used for this purpose. Alternatively, the angle of rotation of the motor shaft can also be ascertained from the motor current, in particular by counting so-called current ripples.

It is disadvantageous that the "logical actuating position" of the vehicle window derived from the angle of rotation of the motor shaft usually matches the actual "mechanical" actuating position only to within a certain error. The reason for this, in particular, is that the actuating mechanism coupling the motor shaft to the window always has a certain system tolerance (also called "system slack"), as a result of which the window is only "soft-coupled" to the motor shaft.

A relatively high system tolerance normally occurs in cable window regulators. The system tolerance here is substantially dependent on the setting properties of the control cable, and for this reason is also referred to as "cable slack."

The system slack of a cable window regulator manifests itself to an especially marked degree during a reversal of the actuating direction, especially since the control cable here must be rewound from the state in which it is tensioned in the original direction until a sufficient tension has been established in the opposite direction in the control cable. During the rewinding, the motor shaft moves while the window to be moved remains stationary.

In the conventional methods for ascertaining the (logical) window position from Hall signal pulses or the counting of current ripples, the process of overcoming the system slack consequently results in a counting of pulses that are not correlated with a corresponding movement of the window. The logical window position is thus variable relative to the mechanical window position, which manifests itself as errors in approaching the desired window position. Since the count error associated with the system slack changes its sign with the actuating direction, a desired actuating position is approached differently from opposite actuating directions.

The error-prone positioning of the window by conventional cable window regulators is a substantial disadvantage for the so-called short-stroke function in particular, in which the window is moved out of the upper door seal of a frameless vehicle door in order to permit the vehicle door to be opened without resistance. Vehicle manufacturers often place tight limits on the short-stroke motion. This is intended to ensure that the window travels completely out of the window seal on the one hand, but on the other hand the window is not open too wide after the short stroke, especially since additional safety precautions, such as automatic pinch protection, are otherwise required in some cases by the applicable legal requirements for the reverse motion of the window.

However, a precise approach is desirable for other actuating positions of a window as well, in particular for approaching the upper or lower pre-shutoff points, where the window normally is stopped before actually reaching the (upper or lower) blocked state. Moreover, precise positioning of a window is also desirable when approaching the so-called RELAN (Relax After Normalization) point, for example. This term is understood to mean the particular window position to which the window is often moved back after adjustment travel to the upper or lower blocked state in order to release the tension in the actuating mechanism.

Apart from this, an ascertainment of the actuating position corrected for the influence of the system slack is also beneficial for other window regulator types as well as other actuating devices in a vehicle, in particular seat adjustments, door and roof actuators, etc.

A problematic aspect of the inaccurate positioning of a window or other vehicle part caused by system slack is, in particular, that the magnitude of the system slack is dependent on many factors, in particular the age of the actuating device, the temperature, the humidity, the starting position of the vehicle part, the preceding actuation process, etc.

Because the system slack in conventional cable window regulators changes primarily due to the age-related setting properties of the cable system, a cable tensioner is sometimes used in such window regulators that irreversibly adjusts itself in the event of elongation of the cable path, and thereby compensates for the age-related increase in the system slack. However, such a cable tensioner requires additional material and assembly expense, which it is desirable to avoid.

A method for system-slack-compensated control of the motion of a window is known from DE 196 32 139 C1, which corresponds to U.S. Pat. No. 6,166,508, which is incorporated herein by reference. Here, the period of the motor rotation is sensed in a time-resolved manner during an actuation process using motion signals of the actuating motor or motor shaft. An initial no-load phase of the actuation process, during which the motor shaft rotates while overcoming the system slack without motion of the vehicle part, is identified by comparison of the time-dependent period with a threshold. During the course of the prior art method, an actuating position measure for the actuating position of the window corrected by the motor rotation during the no-load phase is ascertained by the means that all motion signals before the threshold is exceeded are assigned to the system slack, and accordingly are not evaluated for determining the actuating position measure.

Moreover, within the framework of a pinch protection system of a vehicle actuating device, it is known from WO 2009/121518 A1 to ascertain an operating parameter characterizing the motor load, in particular the motor speed as a function of the actuating travel, during an actuation process, and to determine an inflection point in the time behavior of this operating parameter. In an actuating travel region following the inflection point, a threshold for detecting a pinch event is adjusted by a predetermined offset value in this method. This prevents erroneous detection of a pinch event due to startup-related oscillations in the behavior of the operating parameter.

SUMMARY OF THE INVENTION

It is therefore an object of the invention to make it possible to ascertain especially precisely, but in a way that can be realized with simple means, the actuating position of a vehicle part that can be moved by an electric motor. In particular, it should be possible here to compensate in a simple and precise way for errors that result from overcoming the system slack.

According to the method, in an embodiment, the speed of an actuating motor, or a motor signal correlated therewith, for example the motor current, the period of motor rotation, etc., is acquired in a time-resolved manner during an actuation process. In other words, values for the speed or for the motor signal correlating therewith are acquired at successive points in time during the actuation process. An initial no-load phase of the actuation process is identified through analysis of the curve of the speed or other motor signal, with this no-load phase being characterized by the fact that only the system tolerance (or system slack) of the actuating mechanism is overcome during rotation of the motor shaft, while the rotation of the motor shaft does not cause motion of the vehicle part.

From the motor rotation, an actuating position measure for the actuating position of the vehicle part is now ascertained during the actuation process, with this actuating position measure being corrected for the motor rotation of the actuating motor during the no-load phase—hereinafter referred to as the "unloaded angle of rotation." In other words, the actuating position measure is determined without taking into account the unloaded angle of rotation, so the unloaded angle of rotation also makes no contribution to the change in the actuating position measure.

In particular, within an embodiment of the invention the actuating position measure can be ascertained in a manner that is customary per se from an angle of rotation through which the motor shaft rotates during the actuation process, which is to say that expresses the number of motor shaft rotations in the current actuation process. The angle of rotation can be determined directly (by means of a Hall sensor, for example) or indirectly (from the motor current, for example) here. In a useful embodiment of the invention, a "logical actuating position" is first ascertained from the angle of rotation, and this is then adjusted to the actual "mechanical actuating position" of the vehicle part using the unloaded angle of rotation or another characteristic quantity for the no-load phase.

The second derivative of the speed or of the other motor signal, or a measured quantity correlating herewith, is determined according to the invention in order to detect the end of the no-load phase (and thus the starting of the vehicle part to be moved). From this second derivative or the measured quantity correlating herewith, a test quantity is ascertained by averaging over time, and the end of the initial no-load phase is identified using the test quantity. The end of the initial no-load phase is identified here by the means that the test quantity exceeds a limit (predefined to be nonzero).

The second derivative here can be the second derivative with respect to time. Preferably, however, speed or the other motor signal is derived with respect to the angle of rotation or another logical actuating position measure. In particular, a difference between successive measured values of the speed or other motor signal can be used within the scope of the invention as a measured quantity correlating with the second derivative. The term "averaging over time" is generally understood to mean the determination of an average using multiple values of the second derivative or correlating measured quantity that were acquired at different points in time.

The term "(limit) exceedance" should be understood as being direction-independent in that at this point the difference between the test quantity and the limit changes its sign. Depending on the definition of the test quantity, therefore, the characteristic limit exceedance for the end of the no-load phase can include that the test quantity becomes larger or smaller than the limit.

The method described above is based on the surprising finding that the starting of the vehicle part to be moved is expressed especially precisely and clearly in the time average of the second speed derivative, so this quantity is especially useful for precise and trouble-free actuating position correction.

The chronological sequence of the method steps described above can vary here. In particular, in one variant of the method according to the invention, an uncorrected actuating position measure is calculated first with the contribution of the no-load phase then being compensated for afterward, while in other variants of the method according to the invention, the contribution of the no-load phase is compensated as early as before or during calculation of the actuating position measure.

In an embodiment of the method, a current new value of the test quantity is recursively determined by weighted summation of a current value of the second derivative or the measured quantity correlating herewith and a previously calculated old value of the test quantity. For standardization reasons, it is useful for the weighting factors here to be chosen such that they add up to equal the value of one. Preferably, the old value of the test quantity and the current value of the second derivative, or the measured quantity correlating herewith, are weighted in a ratio of $3/4:1/4$.

The predetermined limit value for identifying the end of the no-load phase is determined empirically, for example. In a simple embodiment of the invention, this limit is specified as a constant. In a useful method, for example, the limit is determined such that the extremum (i.e. maximum or minimum) of the second derivative or of the measured quantity correlating therewith generated by the starting of the vehicle part exceeds the limit at the maximum intended operating temperature (for example, at approximately 80° C.) on average over a predetermined number of test cycles (for example, over 10,000 test cycles) by a predetermined measure (for example, by 10% of the extreme value). This method takes into account the fact that the vehicle part usually starts increasingly easily and smoothly as operating temperatures rise, so the amplitude of variation of the second derivative decreases in corresponding measure.

In an embodiment of the invention, the limit preferably is predefined differently as a function of a temperature, for example in the form of a table of characteristics or a mathematical function. The temperature is, in particular, the outdoor temperature or an ambient temperature of the actuating device, which, for example, is sensed by a temperature sensor located in the immediate vicinity of the vehicle part, or is queried from a central on-board electronics unit of the vehicle, for example the on-board computer.

In an embodiment of the method, the limit is determined by means of a function that applies factors, for example a proportionality factor and an offset, to the temperature. The factors preferably are chosen such that the extremum of the second derivative or of the measured quantity correlating therewith exceeds the limit on average by the same ratio (for example, by 20% of the average extreme value) at every operating temperature (e.g., between −40° C. and 80° C.). In this way, an especially precise identification of the end of the no-load phase is achieved, and thus also an especially precise actuating position correction over the entire operating temperature range of the vehicle.

In an embodiment of the method, an expected value of the unloaded angle of rotation, or a quantity correlating therewith, is determined. Here, the end of the initial no-load phase is only identified when the test quantity exceeds the limit by the expected value within a predetermined interval. Limit exceedances outside of this interval, in contrast, are disregarded. In particular, the limit comparison is only carried out for angles of rotation within this interval. In this process, the expected value is determined, in particular, by averaging the unloaded angles of rotation ascertained in the preceding actuation processes. Specifying the interval creates a measurement window—in particular one that automatically self-adjusts—for determining the end of the no-load phase. Errors in determining the unloaded angle of rotation can be avoided in this way. The expected value that is learned preferably is also used for no-load-corrected determination of the actuating position measure, thus in particular for matching the logical actuating position to the mechanical actuating position.

In order to further improve failsafe characteristics, a value of the unloaded angle of rotation ascertained during an actuation process to produce the expected value is preferably only taken into account when the battery voltage is in a predetermined, permissible value range during this actuation process. Otherwise, the value of the unloaded angle of rotation ascertained in the current actuation process is disregarded. In this way, actuation processes in which the unloaded angle of rotation deviates sharply from the normal case as a result of irregular battery voltage are prevented from distorting the expected value. In an advantageous further development of this variant of the method, however, the battery voltage is not checked until a predetermined time interval or a predetermined angle of rotation interval has been exceeded after the start of the actuation process, so that the drop in the battery voltage that frequently occurs at the beginning of an actuation process due to startup of the actuating motor is excluded.

In addition or alternatively thereto, in another variant of the method the value of the unloaded angle of rotation ascertained during an actuation process to produce the expected value is changed by a correction term that is dependent on the starting position of the vehicle part in this actuation process. In particular, the value of the unloaded angle of rotation ascertained to produce the expected value is increased by a fixed correction term when the vehicle part is not started from an end position that is tensioned against a stop of an actuating path (blocked position or pre-shutoff position), but instead is started from a different actuating position. This takes into account the fact that an increased system slack always arises when the vehicle part is moved from an end position, since the tension of the actuating mechanism must first be released in this case. Fluctuation of the expected value is avoided through the start-position-dependent adjustment of the unloaded angle of rotation.

Also in addition or as an alternative thereto, in another variant of the method the value of the unloaded angle of rotation ascertained during an actuation process to produce the expected value is not taken into account when the vehicle was moved before the actuation process and/or was subjected to severe shocks. "Severe" shocks—as distinguished from normal vibrations caused by travel—are understood here to be shocks that cause the acceleration acting on the vehicle part to be moved and/or the actuating device to exceed a predetermined limit. This takes into account the fact that severe shocks to the actuating mechanism, particularly such as occur when driving on rough terrain (such as off-road, dirt roads, or cobblestones), also cause the vehicle part to move slightly, which causes an irregular system slack to occur in a subsequent actuation process. Within the scope of the invention, a speed signal, in particular, can be queried from an on-board electronic system to detect whether the vehicle has been moved. Within the scope of the invention, an acceleration sensor internal or external to the actuating device can be queried to detect whether the vehicle has been subjected to shocks. In the latter case, the current value of the unloaded angle of rotation preferably only is not taken into account for producing the expected value when the shocks ascertained by the acceleration sensor exceed a predetermined limit. Alternatively, for the purpose of shock detection, an impact or vibration filter of the actuating device, such as is often present in any case as part of a pinch protection system of the actuating device, can be queried within the scope of the invention. An impact or vibration filter of this nature typically analyzes the change in the speed of the actuating device over time in order to distinguish speed changes caused by shock or vibration from a pinch event.

The actuating device comprises an electric actuating motor, an actuating mechanism coupling the actuating motor to the vehicle part, and a control unit for driving the actuating motor. According to the invention, the control unit here is configured by programming and/or a circuit to automatically carry out the above method in one of its embodiments.

In an embodiment, at least the core of the control unit is composed of a microcontroller in which the method according to the invention is implemented by programming in the form of operating software, so that the method is automatically carried out when the operating software is executed in the microcontroller. The vehicle part to be moved is, in particular, a vehicle window. The actuating device is, in particular, a window regulator, preferably a cable window regulator, in which the actuating mechanism comprises a control cable.

For the purpose of querying outdoor or ambient temperature values, the control unit is preferably coupled to the central on-board electronics, in particular the on-board computer. Alternatively, within the scope of the invention the actuating device can also have a temperature sensor that supplies its measured temperature values directly to the control unit.

The method according to the invention finds application in approaching the short-stroke position of the window regulator, in particular. In addition, the method is of particular advantage for defined actuation positions that can be approached from both actuating directions. Over and above the field of application of the window regulator, the method according to the invention can also be used to advantage in any other desired actuating devices in a vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
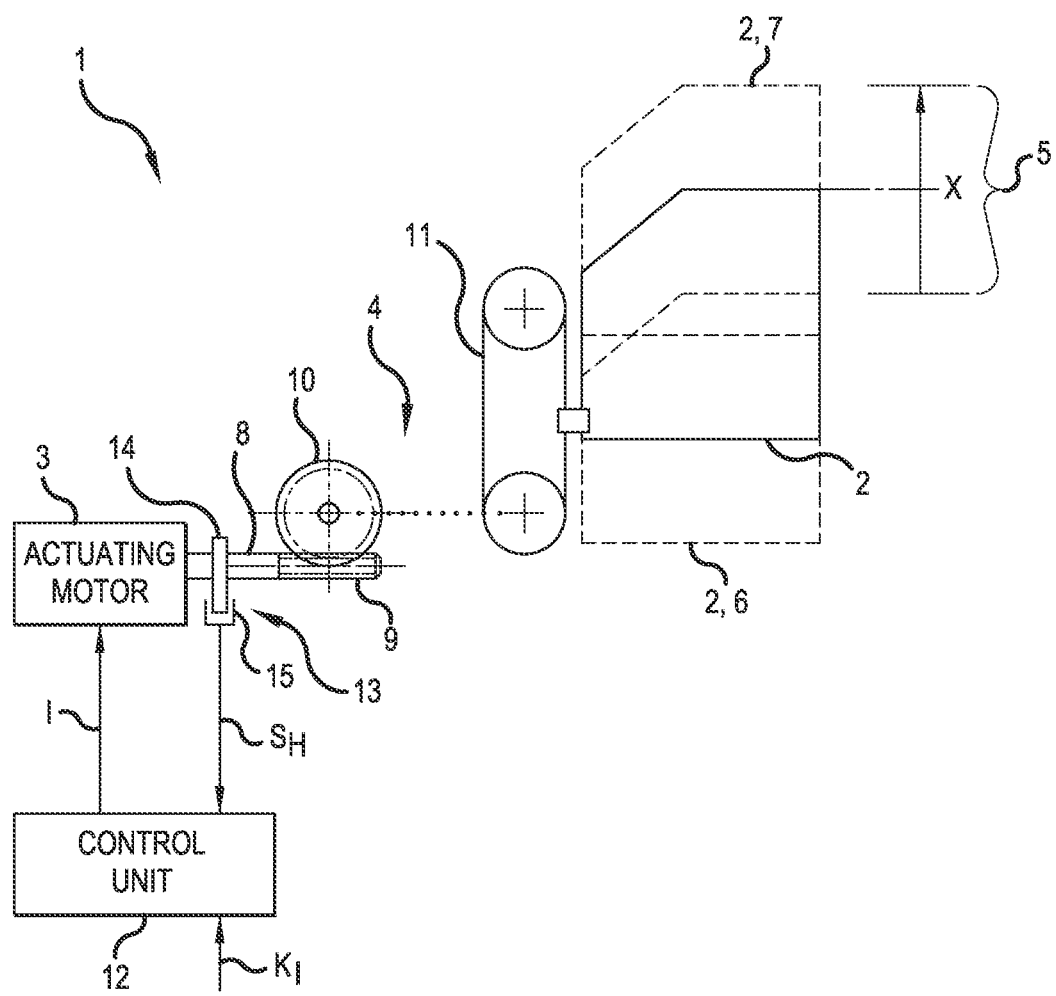
FIG. 1 is a schematic representation of a cable window regulator that has an electric actuating motor, a control unit, and an actuating mechanism comprising a control cable, and also of a vehicle window coupled to the control cable.

Corresponding parts and quantities are always labeled with the same reference characters in all the figures.

FIG. 1 schematically shows an actuating device in the form of a (cable) window regulator 1 for a (vehicle) window 2 of a motor vehicle.

The window regulator 1 comprises an electric actuating motor 3 that is mechanically coupled to the window 2 by an actuating mechanism 4 in such a way that the actuating motor 3 can cause the window 2 to travel reversibly along a travel path 5 between two end positions, namely an open position 6 and a closed position 7.

FIG. 1 shows the window 2 in the open position 6 and the closed position 7, using a dashed outline for each. A solid outline is used to show the window 2 in an intermediate actuating position x between the two end positions. The actuating position x has the value zero, for example, when the window 2 is in the closed position 7.

The actuating mechanism 4 comprises a drive worm 9 that is placed on a motor shaft 8 of the actuating motor 3 and that meshes with a worm gear 10. The actuating mechanism 4 additionally comprises a control cable 11—indicated in FIG. 1 only in a very simplified manner—that is coupled to the worm gear 10 by a transmission (not shown in detail). The control cable 11 is in turn coupled to the window 2 by means of a carrier.

The actuating device 1 additionally comprises a control unit 12 in the form of a microcontroller, and a rotary position sensor 13. The rotary position sensor 13 comprises a multi-pole ring magnet 14 that is attached to the motor shaft 8 in a rotationally fixed manner, and also a Hall sensor 15 that works together with the magnet. During operation of the actuating motor 3, the ring magnet 14, which rotates together with the motor shaft 8 relative to the Hall sensor 15, generates together with the Hall sensor 15 a periodic oscillating pulse signal $S_H$, which is delivered to the control unit 12 by the Hall sensor 15 as an input quantity. During this process, by counting the (Hall) pulses of the pulse signal $S_H$, the control unit 12 calculates a quantity that is proportional to the number of rotations of the motor shaft 8 in the current actuation process; this quantity is referred to below as angle of rotation φ. By adding the angle of rotation φ to a stored initial value $x'_0$, the control unit 12 calculates a time-dependent logical actuating position of the window 2, which is referred to below as actuating position measure x'. In addition to the actuating position measure x', the control unit 12 calculates the speed n of the motor shaft 8 by counting the Hall pulses of the control signal $S_H$ per unit of time or by measuring the inter-pulse times. Furthermore, an actual (temperature) value $K_I$ of the ambient temperature K is supplied to the control unit 12 (in a manner that is not shown in detail). The actual value $K_I$ is made available, for example, by a temperature sensor associated with the actuating device 1 or by a central on-board electronics system of the motor vehicle.

The control unit 12 drives the actuating motor 3 by delivering a motor current I. The control unit 12, in turn, is supplied with electric power by a vehicle battery.

Figure 2:
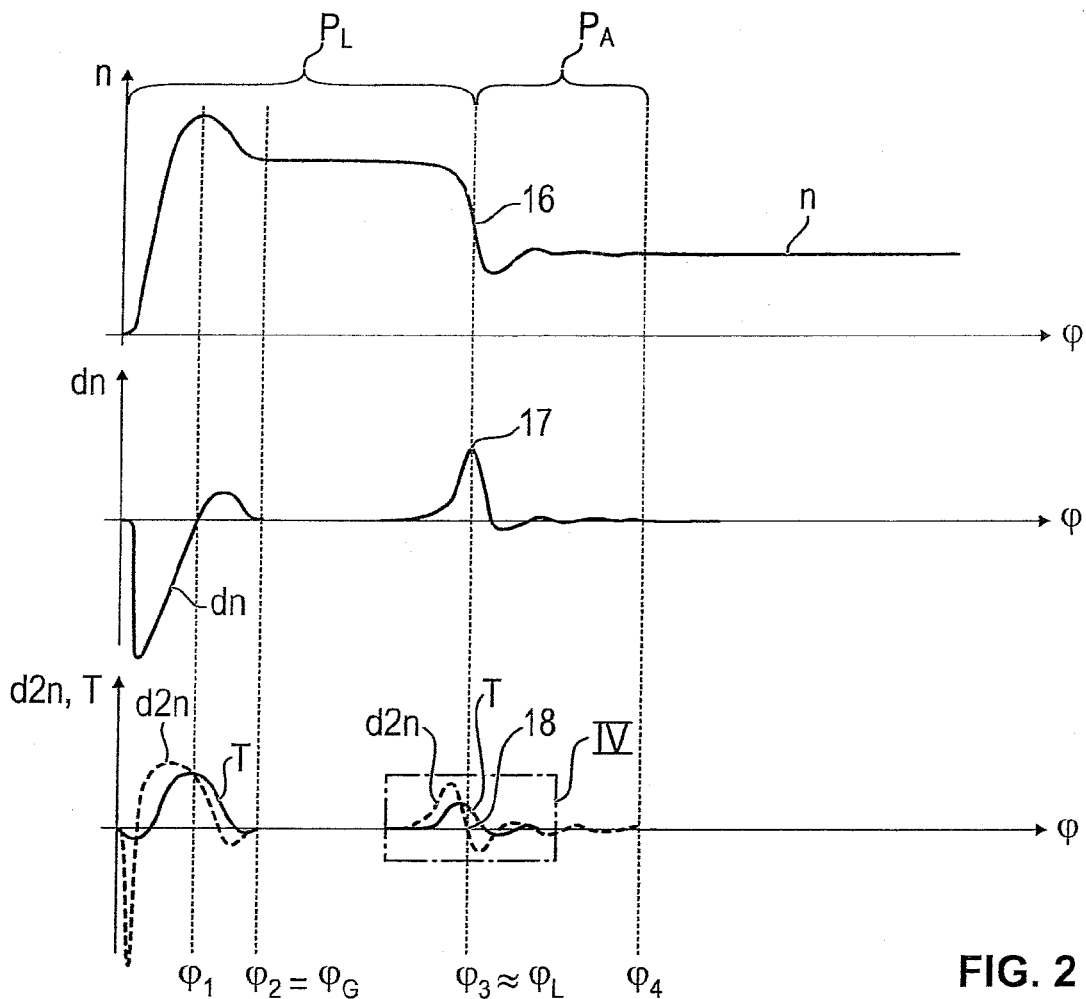
FIG. 2 illustrates stacked graphs of the curve of the speed of the electric motor (top graph), the negative first derivative of the speed curve (center graph), and the negative second derivative of the speed curve and a test quantity produced by averaging over the second derivative (bottom graph), versus the angle of rotation of the actuating motor.

In the initial phase of an actuation process, in which the window 2 is to be moved from its closed position 7 towards the open position 6, for example, the speed n of the motor shaft 8 typically follows a curve such as is shown schematically as a function of the angle of rotation φ in the top graph in FIG. 2. It is evident from this representation that the speed n rapidly rises to a high value immediately after startup of the actuating motor 3, especially since the rotation of the motor shaft 8 initially is supported by the actuating mechanism 4 that is still tensioned in the closing direction. After passing through a maximum speed at an angle of rotation $\phi_1$, the speed n drops to a plateau value—still relatively high—at an angle of rotation $\phi_2$. At the angle of rotation $\phi_2$ the initial tensioning of the actuating mechanism 4 is completely released. The control cable 11 is now rewound—at an approximately constant speed n—until the actuating mechanism 4 (in particular the control cable 11) is sufficiently tensioned in the opening direction to be able to transmit sufficient force to move the window 2.

The startup of the window 2 is characterized by an abrupt rise in the motor load, which manifests itself in the speed curve in FIG. 2 as a sharp drop in the speed n at an angle of rotation $\phi_3$. This angle of rotation $\phi_3$, which in FIG. 2 marks the inflection point 16 in the falling edge of the speed curve, coincides approximately—but usually not exactly—with the end of an initial no-load phase $P_L$ of the actuation process and the transition to a subsequent startup phase $P_A$, in which the window 2 begins to move. The angle of rotation $\phi_3$ thus corresponds approximately—but again, usually not exactly—to the angle of rotation φ, referred to below as the unloaded angle of rotation $\phi_L$, through which the motor shaft 8 is rotated during the no-load phase $P_L$ ($\phi_L \approx \phi_3$). The startup phase $P_A$ ends at an angle of rotation $\phi_4$, at which the speed n of the actuating motor 3 has settled to a constant value.

As is evident from the center and bottom graphs in FIG. 2, this inflection point 16 manifests itself in the first derivative dn (negated here, which is to say multiplied by a factor of −1) of the speed curve as a pronounced maximum 17, and in the second derivative d2n (likewise negated here) as a zero crossing 18.

Figure 3:
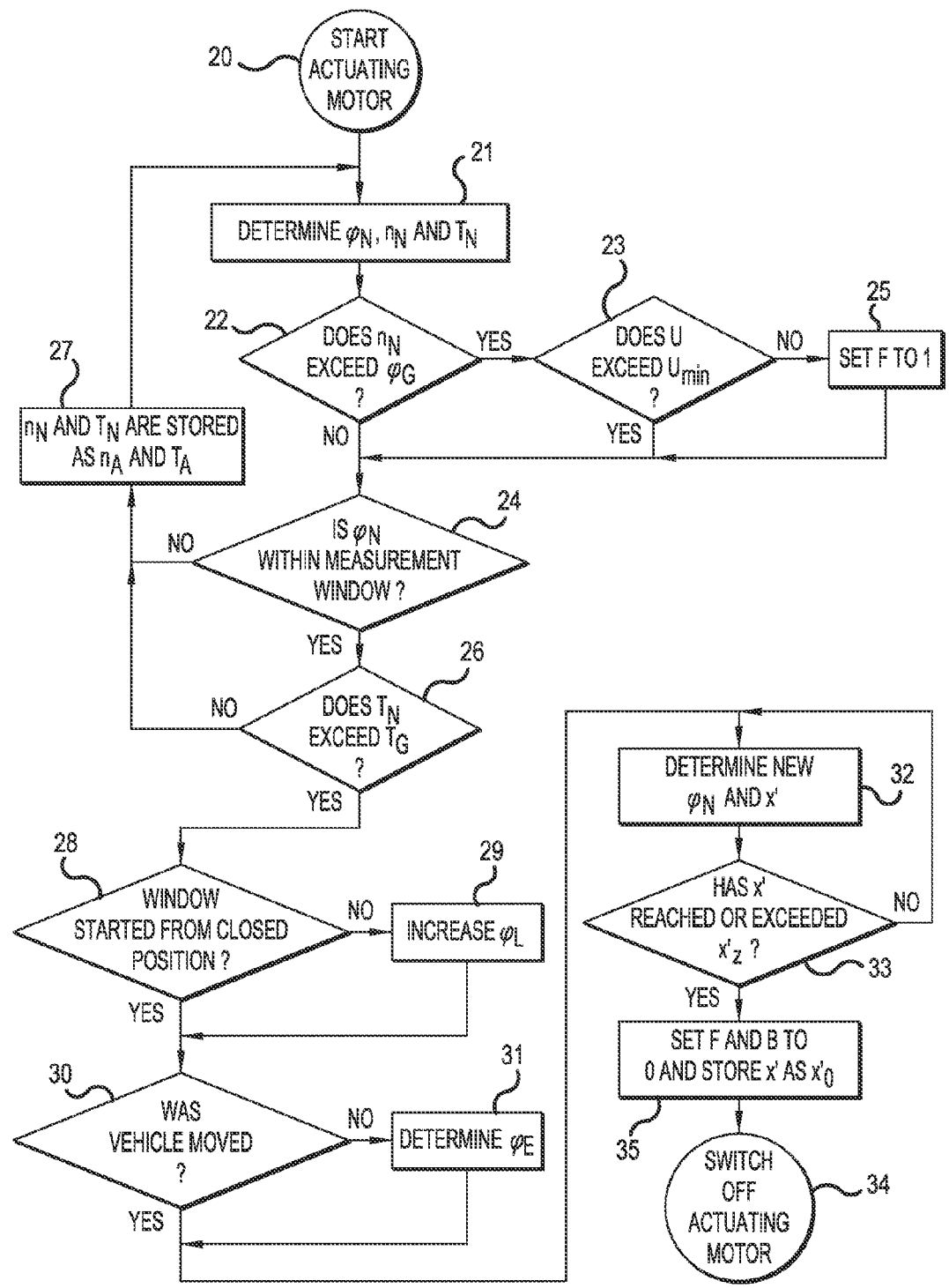
FIG. 3 is a simplified, schematic flowchart of a method for ascertaining the actuating position of the window and for performing a short-stroke actuation process carried out automatically by a control unit.

This characteristic curve of the speed n is exploited by the control unit 12 to establish the actual start of the window motion, and thus to correct the actuating position measure x' for the unloaded angle of rotation $\phi_L$. To this end, the method shown schematically in simplified form in FIG. 3 is implemented by software in the control unit 12.

During the course of this method, the control unit 12 initially starts the actuating motor 3 in a first (method) step 20, immediately setting the motor shaft 8 in rotation. In a next (method) step 21, the control unit 12 determines a current value (hereinafter referred to as new value $\phi_N$ or $n_N$) of the angle of rotation $\phi$ and of the speed n. The control unit 12 additionally determines the associated first and second derivatives dn and d2n of the speed n. As a measure for the first derivative dn, the control unit 12 determines the difference between two successive values of the speed n:

$$dn = n_A - n_N \qquad \text{Eq. 1}$$

Correspondingly, the control unit 12 determines the difference between two successive values of the first derivative dn as a measure for the second derivative d2n. Through recursive weighted averaging over successive values of the second derivative, the control unit 12 ultimately determines a current value (new value $T_N$) of a test quantity T:

$$T_N = \frac{1}{4} \cdot d2n + \frac{3}{4} \cdot T_A \qquad \text{Eq. 2}$$

The quantities $n_A$ and $T_A$ in Eq. 1 and Eq. 2 denote stored old values of the speed n or of the test quantity T, respectively. In order to avoid significant rounding errors during the numerical conversion on simple microprocessors, Eq. 2 is implemented—in mathematically equivalent transformation—in the formulas $$T^* = 32 \cdot (d2n - T_A) + T^* \qquad \text{Eq. 3}$$

$$T_N = \frac{1}{128} \cdot T^* \qquad \text{Eq. 4}$$

The variable T* represents an auxiliary variable here. Using the recursively formulated Eq. 3, the value of the variable T* is determined anew with the result of the expression on the right-hand side, with the previous value of the variable T* entering into this expression.

The curve of this test quantity T as a function of the angle of rotation $\phi$ is contrasted with the second derivative d2n in the bottom graph in FIG. 2. As is evident from this figure, the test quantity T lags the second derivative d2n. In this way, the test quantity T has a significantly nonzero value at the angle of rotation $\phi_3$ corresponding to the inflection point 16 of the speed curve.

After these calculations, in a (method) step 22, the control unit 12 checks whether the new value $\phi_N$ of the angle of rotation exceeds a stored limit $\phi_G$ ($\phi > \phi_G$?). If the condition checked in step 22 is met, the control unit 12 executes a (method) step 23. Otherwise (N), the control unit 12 proceeds to another method step 24.

In step 23 the control unit 12 checks whether the battery voltage U of the vehicle battery exceeds a predetermined limit $U_{min}$ of, for example, 10 V ($U > U_{min}$?). If yes (J), the control unit 12 immediately proceeds to step 24. Otherwise (N), in a (method) step 25 the control unit 12 first sets a variable indicating a battery fault (hereinafter battery fault flag F) to the value one (F=1).

Figure 4:
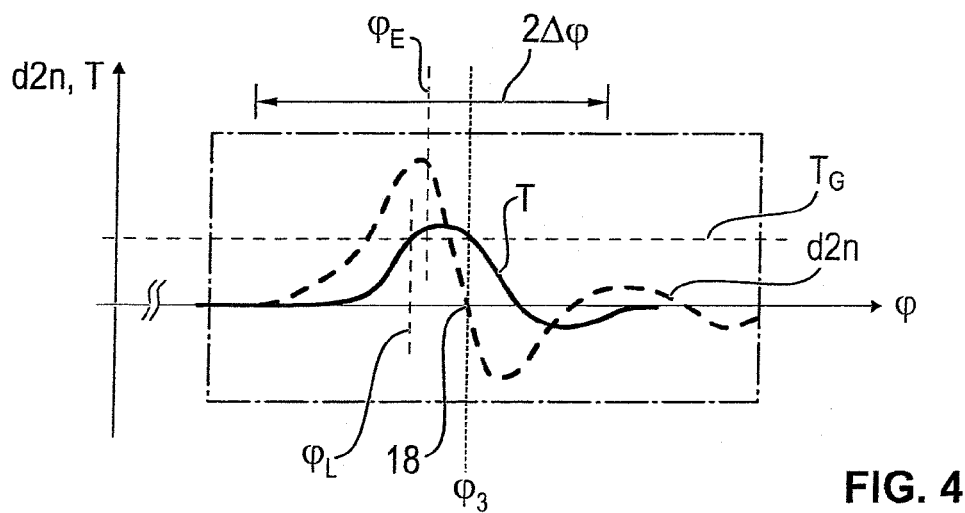
FIG. 4 is an enlarged section VI from FIG. 2 of the second derivative of the speed and the test quantity shown there in the bottom graph.

In step 24 the control unit 12 checks whether the new value $\phi_N$ of the angle of rotation $\phi$ is within a measurement window that results from a predefined interval $2\Delta\phi$ around a stored expected value $\phi_E$ ($\phi_E - \Delta\phi \leq \phi \leq \phi_E + \Delta\phi$?). The quantity $\Delta\phi$ here designates half the width of the interval $2\Delta\phi$, which is drawn in FIG. 4 by way of example. The expected value $\phi_E$ specifies the unloaded angle of rotation $\phi_L$ to be expected. In contrast to the example described above, the interval $2\Delta\phi$ can also be defined to be asymmetric with respect to the expected value $\phi_E$.

If the condition checked in step 24 is met (J), the control unit 12 proceeds to (method) step 26. Otherwise (N), the control unit 12 branches back to step 21 through (method) step 27, in which the new values $n_N$ and $T_N$ are stored as corresponding old values $n_A$ and $T_A$ ($n_A = n_N$; $T_A = T_N$). In other words, a new 'new value' $\phi_N$ of the angle of rotation $\phi$ and a new 'new value' $n_N$ of the speed n are ascertained, and the derivatives dn and d2n of the latter and a new 'new value' $T_N$ of the test quantity T are generated again.

In step 26 the control unit 12 checks whether the new value $T_N$ of the test quantity T exceeds a limit $T_G$ ($T > T_G$?). If applicable, the control unit 12 interprets the exceedance of the limit $T_G$, also drawn in FIG. 4, by the test quantity T as an indicator of the end of the no-load phase $P_L$. If the condition checked in step 26 is met (J), the control unit 12 proceeds to (method) step 28. Otherwise (N), the control unit 12 again branches back to step 21 through step 27.

For step 26, the control unit 12 determines the limit $T_G$ as a function of the actual value $K_I$ of the ambient temperature K using the formula $$T_G(K_I) = K_I \cdot m + o \qquad \text{Eq. 5}$$

The parameters m and o in Eq. 5 here are chosen—through empirical experimentation for example—such that the curve of the test quantity T exceeds the limit $T_G$ by the same ratio (e.g., by 20% of the maximum of the test quantity T), on average, at every actual value $K_I$ of the ambient temperature K. In other words, the limit $T_G$ is adjusted such that the test quantity T always intersects it at the same ratio (e.g., at 80% of the maximum) at every operating temperature. The parameter m and/or the parameter o can optionally likewise be stored as a function of the ambient temperature K.

In step 28 the control unit 12 checks whether the window 2 was started from the closed position 7 (in particular, therefore, from the upper pre-shutoff—position) in the current actuation process, and the initial value $x'_0$ of the actuating position measure x' is thus zero ($x'_0 = 0$?). If so (J), the control unit 12 adopts the new value $\phi_N$ of the angle of rotation $\phi$ unchanged as the unloaded angle of rotation $\phi_L$ ($\phi_L = \phi_N$). Otherwise (N), in a (method) step 29, the control unit 12 increases the unloaded angle of rotation $\phi_L$ as compared to the new value $\phi_N$ by a predetermined correction term $\phi_K$ of, for example, ten quarter rotations of the motor shaft 8 ($\phi_L = \phi_N + \phi_K$).

In a (method) step 30 following step 28 or 29, the control unit 12 checks whether the vehicle having the window regulator 1 was moved during the time between the previous actuation process and the current actuation process. To this end, the control unit 12 checks whether a variable indicating vehicle motion (hereinafter referred to as motion flag B) is set and accordingly has the value one (B=1?). The motion flag B is set to the value one by the control unit 12 when an on-board electronics unit of the vehicle connected to the control unit by data transmission reports a nonzero vehicle speed between two actuation processes.

If the condition checked in step 30 is not met (N), which is to say the vehicle was not moved, in a (method) step 31 the control unit 12 learns the unloaded angle of rotation $\phi_L$ ascertained in the current actuation process by the means that it determines the expected value $\phi_E$ anew through recursive weighted averaging of this unloaded angle of rotation $\phi_L$ with the unloaded angles of rotation of preceding actuation processes:

$$\varphi_E = \frac{1}{w} \cdot \varphi_L + \frac{w-1}{w} \cdot \varphi_E, \qquad \text{Eq. 6}$$

where the parameter w is a constant natural number (for example, w=10). In Eq. 6, in analogous fashion to Eq. 3, the value of the variable $\varphi_E$ also is determined anew with the result of the expression on the right-hand side, with the previous value of the variable $\varphi_E$ entering into this expression.

If, in contrast, the condition checked in step 30 is met (J) [yes], the control unit 12 disregards the unloaded angle of rotation $\varphi_L$ ascertained in the current actuation process, and proceeds directly to a (method) step 32.

In step 32 the control unit 12 ascertains a new 'new value' $\varphi_N$ of the angle of rotation $\varphi$. Furthermore, the control unit 12 calculates the actuating position measure x' from the new value $\varphi_N$ minus the expected value $\varphi_E$ for the unloaded angle of rotation $\varphi_L$:

$$x' = x'_0 + r \cdot c \cdot (\varphi_N - \varphi_E). \qquad \text{Eq. 7}$$

The parameter r in Eq. 7 has the value +1 for an actuating motion in the opening direction, and the value −1 for an actuating motion in the closing direction. The parameter c stands for an empirically determined proportionality constant.

In a (method) step 33, the control unit 12 now checks whether the actuating position measure x' determined using Eq. 7 has reached or exceeded a predetermined target value $x'_Z$ (r·x'≥r·x'$_Z$?). As long as this condition is not met (N), and thus the window 2 has not yet reached its target position, the control unit 12 branches back to step 32. Otherwise (J) [yes], the control unit 12 terminates the current actuation process by switching off the actuating motor 3 in a (method) step 34. Simultaneously, subsequently, or—as shown by way of example in FIG. 3—beforehand, in a (method) step 35 the control unit 12 sets the battery fault flag F and the motion flag B to the value zero, and stores the last determined actuating position measure x' as the initial value x'$_0$ for the next actuation process.

The method described above is applied to all actuation processes carried out with the actuating device 1 and is used, in particular, for precisely approaching the short-stroke position.

The subject matter of the invention is not limited to the exemplary embodiment described above. Rather, additional embodiments of the invention can be derived from the above description by one skilled in the art. In particular, the order of the above-described steps can be switched without deviating from the invention. Moreover, method steps can be combined or divided and the specified formulas can be used in mathematically transformed forms within the scope of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claim.

What is claimed is:

1. A method for ascertaining the actuating position of a vehicle part of a vehicle that is moveable via an electric actuating motor via an actuating mechanism, the method comprising:
    acquiring a speed of an actuating motor or a motor signal correlated therewith in a time-resolved manner during an actuation process;
    identifying an initial no-load phase of the actuation process through analysis of a curve of the speed or motor signal, during which the actuating motor rotates while overcoming a system tolerance of the actuating mechanism without motion of the vehicle part;
    ascertaining an actuating position measure for the actuating position of the vehicle part during the actuation process from the motor rotation, with this measure being corrected for the unloaded angle of rotation of the actuating motor during the no-load phase;
    determining a second derivative of the speed or of the motor signal or a measured quantity correlating herewith;
    ascertaining a test quantity by averaging over time of the second derivative or the measured quantity correlating herewith; and
    identifying an end of the initial no-load phase when the test quantity exceeds a predetermined limit.

2. The method according to claim 1, wherein a current new value of the test quantity is determined by weighted summation of a current value of the second derivative or the measured quantity correlating herewith and a previously calculated old value of the test quantity.

3. The method according to claim 2, wherein an old value of the test quantity and the current value of the second derivative or the measured quantity correlating therewith are weighted in a ratio of ¾:¼.

4. The method according to claim 1, wherein an expected value of the unloaded angle of rotation is determined, and wherein the end of the initial no-load phase is only identified when the test quantity exceeds the limit by the expected value within a predetermined interval.

5. The method according to claim 4, wherein an unloaded angle of rotation ascertained during an actuation process to produce the expected value is only taken into account when the battery voltage is in a predetermined, permissible value range during this actuation process.

6. The method according to claim 5, wherein the battery voltage is not checked until a predetermined time interval or motor rotation interval after the start of the actuation process.

7. The method according to claim 4, wherein an unloaded angle of rotation ascertained during an actuation process to produce the expected value is changed by a correction term that is dependent on the starting position of the vehicle part in this actuation process.

8. The method according to claim 4, wherein an unloaded angle of rotation ascertained during an actuation process to produce the expected value is not taken into account when the vehicle was moved before the actuation process and/or was subjected to severe shocks.

9. The method according to claim 1, wherein a temperature, in particular the outdoor temperature, is ascertained, and wherein the limit is specified differently as a function of the temperature.

10. An actuating device for automatically moving a vehicle part, the device comprising:
    an electric actuating motor;
    an actuating mechanism that couples the actuating motor to the vehicle part; and
    a control unit for driving the actuating motor,
    wherein the control unit is configured to automatically carry out the method according to claim 1.

11. The actuating device according to claim 10, wherein the actuating mechanism comprises a control cable.

* * * * *